Figure 1:
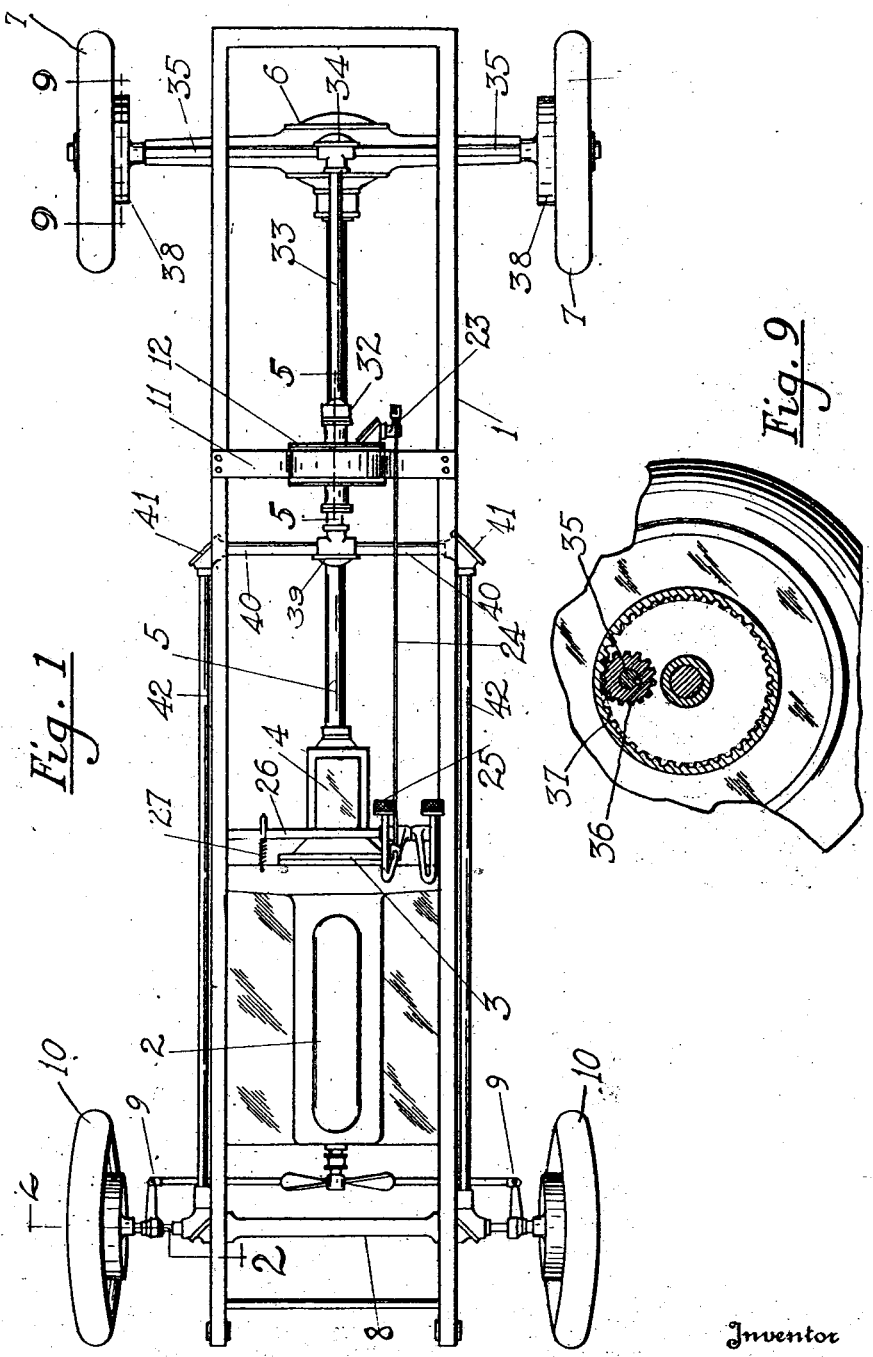

Nov. 18, 1930.  M. M. INNIS ET AL  1,781,843
MOTOR VEHICLE BRAKE MECHANISM
Filed Aug. 22, 1929  2 Sheets-Sheet 1

Inventor
M·M·Innis
O·S·Ward
By W. D. McDowell
Attorney

Nov. 18, 1930.  M. M. INNIS ET AL  1,781,843
MOTOR VEHICLE BRAKE MECHANISM
Filed Aug. 22, 1929   2 Sheets-Sheet 2
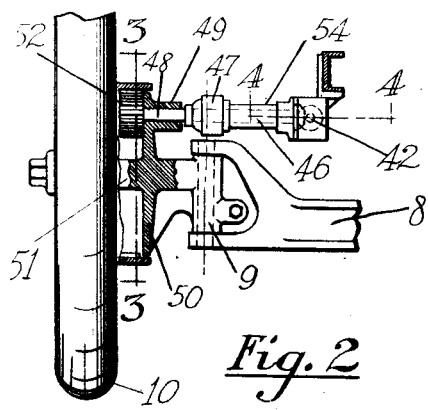
Fig.2
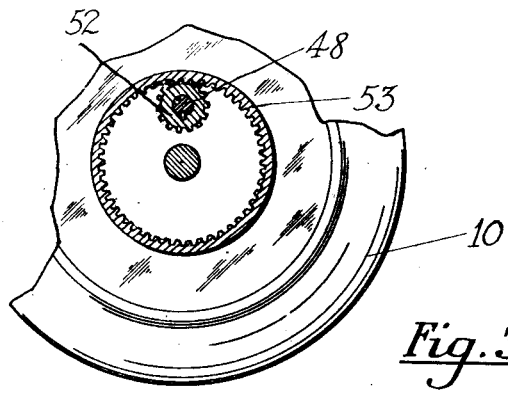
Fig.3
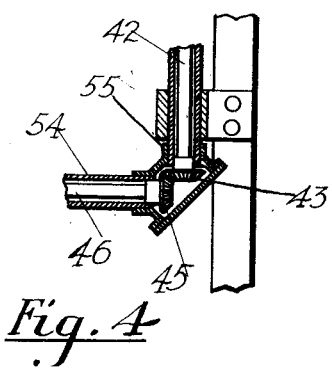
Fig.4
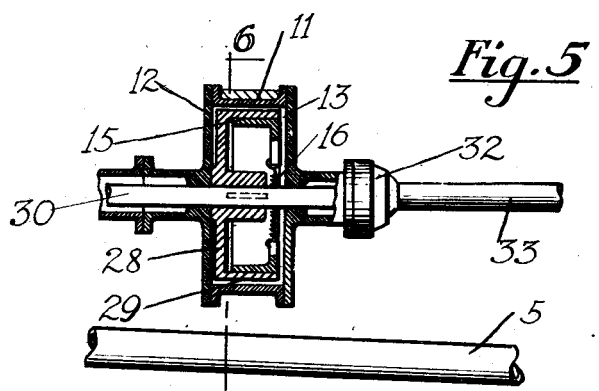
Fig.5
Fig.6
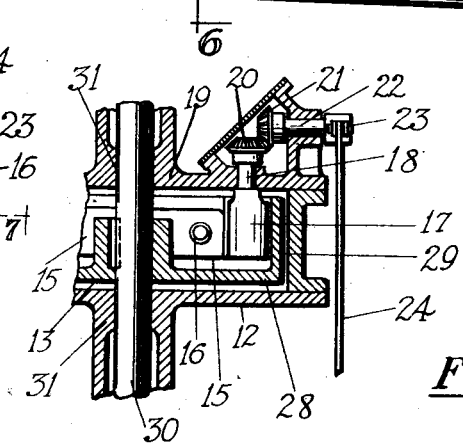
Fig.7
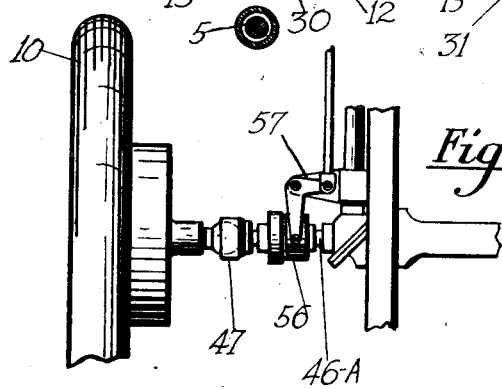
Fig.8
Inventor
M.M. Innis
O.S. Ward
By H.D. McDowell
Attorney Patented Nov. 18, 1930

1,781,843

UNITED STATES PATENT OFFICE

MERRILL M. INNIS AND ORVILLE S. WARD, OF COLUMBUS, OHIO

MOTOR-VEHICLE BRAKE MECHANISM

Application filed August 22, 1929. Serial No. 387,627.

The present invention relates to brake mechanisms of the type adapted for use in conjunction with motor vehicles, and has for its object to improve the construction and efficiency of brake mechanisms of this type.

A preferred embodiment of the invention is illustrated in the accompanying drawings, in which:

Figure 1 is a top plan view of a motor vehicle chassis provided with a brake mechanism constructed in accordance with our invention, Figure 2 is a transverse cross-sectional view taken through the brake mechanism as applied to the front or steering wheels of the motor vehicle, the plane of the section being indicated by the line 2—2 of Figure 1, Figure 3 is a vertical sectional view taken through the brake mechanism on the plane indicated by the line 3—3 of Figure 2, Figure 4 is a horizontal sectional view taken on the line 4—4 of Figure 2, Figure 5 is a vertical longitudinal sectional view taken through the centralized brake unit, the plane of the section being indicated by the line 5—5 of Figure 1, Figure 6 is a vertical sectional view on the line 6—6 of Figure 5, Figure 7 is a horizontal sectional view taken through the centralized braking unit on the plane indicated by the line 7—7 of Figure 6, Figure 8 is a detail view disclosing a slightly modified form of the invention, and Figure 9 is a vertical sectional view taken through the brake mechanism on the plane indicated by the line 9—9 of Figure 1.

Referring more particularly to the drawings, the numeral 1 designates the frame of a motor vehicle. Mounted in the frame is the usual internal combustion engine 2 with which is associated the usual clutch 3 and gear transmission 4. From the transmission the propeller shaft 5 extends to the differential 6 and to the rear axles of the vehicle which drive the rear wheels 7. The front axle of the frame is designated by the numeral 8, the ends of which are provided with steering knuckles 9 with which are connected the front or steering wheels 10. The front and rear axles are connected by spring suspensions with the frame 1. The parts so far described are of standard construction and operation and a description thereof is given merely for the purpose of facilitating a clear understanding of the brake mechanism comprising the present invention which is used in connection therewith.

Arranged above the propeller shaft 5 and carried by the frame 1 is a transversely extending brace 11. This brace supports a stationary circular casing 12 which is formed to include an internal chamber 13. Fixed to one of the stationary walls of the chamber 13 is a stud 14, which acts as a fulcrum for a pair of brake shoes 15 of segmental form. Normally, these shoes are drawn together by means of springs 16, shown in Figure 6, but are separated by the interposition of a cam 17 between adjoining ends thereof.

The cam 17 is carried by a shaft 18 which is journaled for rotation in one of the stationary side walls 19 of the casing 12. This shaft carries at its outer end a bevel gear 20, which meshes with a corresponding gear 21, the latter being mounted upon one end of a short shaft section 22, which is journaled in connection with the outer portion of the wall 19. Attached to the outer end of the section 22 is an upright crank arm 23, and to the upper end of this arm there is connected a forwardly extending rod 24. The forward end of this rod is connected with a foot pedal 25 which is mounted for rocking movement on a cross member 26, a spring 27 being connected with said cross member to maintain the same normally in a non-braking position, requiring the application of foot pressure to the pedal for the purpose of producing a braking action.

Arranged within the casing 12 is a brake wheel 28 having a peripheral flange 29 of circular form. The inner surface of this flange is disposed immediately contiguous to the outer braking surfaces of the shoes 15, so that when the cam 17 is rotated to expand the shoes the latter will be brought into frictional engagement with the inner wall of said flange for the purpose of arresting rotation on the part of the wheel 28.

The wheel 28 is carried for rotation upon a longitudinally extending shaft 30 journaled in connection with the casing 12, as indicated by the bearings 31. The rear end of the shaft 30 is connected with a universal joint 32 of any suitable design, and connected with and extending rearwardly from the joint 32 and arranged above the propeller shaft 5, is a rearwardly extending brake shaft 33. The rear end of the shaft 33 enters a differential mechanism 34 of standard construction which differential mechanism drives a pair of transversely extending shaft sections 35, which extend parallel with and immediately over the rear drive axles of the chassis. The outer ends of the shaft sections 35 are connected with gears 36, the teeth of which mesh with an internal gear 37 provided in drums 38 which are fixed for rotation with the rear drive wheels 7 of the vehicle.

The forward end of the shaft 30 enters a differential mechanism 39 which, in turn, drives a pair of transversely extending shaft sections 40 which are journaled for rotation in connection with the frame 1. The outer ends of the shaft section 40 are equipped with bevelled gears which are located in casings 41 and which mesh with corresponding gears provided upon the rear ends of forwardly and longitudinally extending shafts 42. The shafts 42 are journaled in connection with the frame 1 and extend parallel and in longitudinal relationship with the side members of the frame 1. The forward ends of the shafts 42 are provided with bevelled gears 43, as shown in Figure 4, which mesh with complemental bevelled gears 45 secured to short shaft sections 46 which are disposed immediately above the ends of the front axle 8. The outer ends of the shaft sections 46 are connected with universal joints 47, arranged in vertical registration with the steering knuckles 9 and also connected with the joints 47 are shaft sections 48 which are journaled in bearings 49 formed in connection with stationary plates 50 which constitute a part of the spindle 51 around which the front wheels 10 rotate. The outer ends of the sections 48 are equipped with pinions 52, which mesh with the teeth of an internal gear 53 fixed for rotation upon each of the steering wheels 10. It will be observed that the universal joints 47 are disposed immediately over the steering knuckles 9 in order to avoid interference with the free turning movement of the steering wheels, and furthermore, the housings 54 in which the shaft sections 46 are journaled have pivotal connections as at 55 which the casings employ for rotatably receiving the shafts 42. This construction permits of relative vertical movement between the steering wheels and the frame and also for the turning movement of the steering wheels around the vertical axes of the steering knuckles 9.

The operation of the mechanism is as follows: By depressing the pedal 25 for the purpose of checking the movement of the vehicle, the brake shoes 15 will be expanded by means of the cam 17, actuated by the motion transmission device connecting said cam and pedal and engaging the flange 29 of the rotating wheel 28. This will tend to arrest the movement of the shaft 30, the connecting shafts 33 and 35, leading to the rear wheels of the vehicle, and the shafts 40, 42 and 46, leading to the front driving wheels. As the pinions 36 and 52 are connected to the ends of the shafts 35 and 46 respectively, and engage the internal gears carried by the driving wheels, it will be seen that the movement of the wheels will be arrested which, due to engagement with the road surface, will check the velocity of the vehicle.

Having now described the invention in detail, we will endeavor to point out the more important advantages thereof. By the provision of the centrally located braking unit an equal application of braking effort is applied to all four wheels of the motor vehicle. In the ordinary brake mechanism now used on motor vehicles, expanding brake shoes at the place indicated at 15 or their equivalents are used in connection with each of the ground engaging wheels of a motor vehicle. Very considerable difficulty has been encountered in devising motion transmitting means whereby uniform braking action on the part of these four brake mechanisms is secured. However, by the present invention through the employment of but a single braking mechanism, together with the motion transmitting gearing associated therewith and leading to each of the wheels a very uniform and positive braking action is applied to the wheels 7 and 10. If desired, as shown in Figure 8 the shaft sections 46$^a$ may be provided with clutches 56. These clutches are connected by operating appliances 57 with the foot pedal 25 so that it is only when the braking effort is applied that motion is employed to the rotary shafts 42 and to the shafts 33 and 35. All of the rotary operating parts of this brake mechanism are mounted in enclosed casings in which lubricants are maintained so that the parts may operate smoothly and without noise and wear.

While we have shown and described the preferred embodiment of the present invention, it will be understood that changes may be made in the details of construction without departing from the spirit of the invention or scope of the appended claims.

What is claimed is:

1. In a motor vehicle, a frame, ground engaging wheels carried by the frame, a motor, and motion transmitting mechanism between said motor and at least certain of said wheels, of a brake mechanism comprising an internal gear fixed for rotation in connection with each of the ground engaging wheels, a pinion in engagement with the teeth of each of said gears, shafts carried by said frame and mounted independently of the drive mechanism for said wheel, said shafts being rotatably connected with said pinions, a main brake shaft rotated by said first named shafts in unison with said wheels, and a central brake unit carried by said frame and operative through manual control to govern the rotation of said wheels independently of said drive mechanism by applying rotation retarding forces to said brake shaft.

2. In a motor vehicle, the combination with a frame, ground engaging wheels carried by said frame, a motor, and motion transmitting mechanism between said motor and said wheels, of a brake mechanism comprising a centrally disposed rotatable brake member carried by said frame, drive gearings actuated by the rotation of said ground engaging wheels for effecting the rotation of said brake member, and a central brake unit carried by said frame in spaced relation from said ground wheels and operative through manual control to govern the rotation of said wheels by applying rotation retarding forces to said brake member.

3. In a motor vehicle, a brake mechanism comprising an internal gear fixed for rotation in connection with each of the ground engaging wheels of the vehicle, a rotatable brake member carried by the frame of the vehicle, positively acting gearings driven by the rotation of said internal gears for effecting the rotation of said brake member, and manually controlled means for applying rotation retarding forces to said brake member.

4. In a motor vehicle, a frame, ground engaging wheels carried by said frame, a rotatable brake member carried by said frame, motion transmitting gearing mounted on said frame independently of the drive mechanism for said wheels for effecting rotation of said brake member in unison with said wheel, and manually controlled means for applying rotation retarding forces to said brake member.

5. In a motor vehicle, a frame, a pair of ground engaging steering wheels carried by said frame for turning movement around substantially vertical axes, a rotatable brake member carried by said frame, positively operating gearing mounted in connection with said frame for effecting the rotation of said brake member in unison with the rotation of said steering wheel, said gearing being operable throughout all steering positions of said wheel, and manually controlled means for applying rotation retarding forces to said brake member for controlling at will the rotation of the steering wheels.

6. In a motor vehicle, a frame, steering and driving wheels carried by said frame, a rotatable brake member carried by said frame, motion transmitting means between said brake member and said driving wheel including a differential, said means serving to effect rotation of said brake member in unison with said driving wheels, complemental motion transmitting means between said brake member and said steering wheels including a differential and flexible sections for effecting rotation of said brake member in unison with the steering wheels and to adapt said last named motion transmitting means to the operative positions of said steering wheels with respect to said frame, and manually operative means for governing the rotation of said wheels by applying rotation retarding forces to said brake member and its associated motion transmitting means leading to said wheels.

7. In a motor vehicle, a frame, a pair of steering wheels journaled in connection with said frame for turning movement about substantially vertically disposed axes, a rotatable brake member carried by said frame, gears fixed for rotation in connection with said steering wheels, pinions mounted for engagement with said gears, adjustable shafts rotated by said pinions, a plurality of longitudinally extending shafts carried by said frame and driven by the rotation of said adjustable shafts, a pair of cross shafts journaled in connection with said frame and driven by said longitudinally extending shafts, a shaft fixed for rotation with said brake member, a differential mechanism between said cross shafts and said brake shaft, and manually operated means for applying rotation retarding forces to said brake member and to its associated shafts and gearing leading to said steering wheels.

8. In a motor vehicle, a frame, a pair of driving wheels carried by said frame, a motor, and motion transmitting means between said motor and said driving wheels, of a brake mechanism comprising a rotatable brake member mounted in said frame, a longitudinally extending shaft extending from said brake member, cross shafts independent of the drive mechanism for said wheels, a differential mechanism between said brake member shaft and said cross shafts, gears rotatable in unison with said driving wheels, and pinions in engagement with said gears and carried by the outer ends of said cross shafts, and means for applying rotation retarding forces to said brake members and to its associated shafts and gearing leading to said driving wheels.

In testimony whereof we affix our signatures.

MERRILL M. INNIS.
ORVILLE S. WARD.